(12) United States Patent
Mrotek

(10) Patent No.: US 7,438,345 B2
(45) Date of Patent: Oct. 21, 2008

(54) CONVERTIBLE TOP DEVICE AND METHOD

(76) Inventor: William C. Mrotek, 7491 Sunset Dr., Two Rivers, WI (US) 54241

( * ) Notice: Subject to any disclaimer, the term of this patent is extended or adjusted under 35 U.S.C. 154(b) by 278 days.

(21) Appl. No.: 11/202,151

(22) Filed: Aug. 11, 2005

(65) Prior Publication Data
US 2006/0033356 A1 Feb. 16, 2006

Related U.S. Application Data

(60) Provisional application No. 60/601,471, filed on Aug. 13, 2004.

(51) Int. Cl.
*B60J 7/12* (2006.01)
(52) U.S. Cl. ...................................... 296/116
(58) Field of Classification Search ................ 296/77.1, 296/107.01, 116, 121
See application file for complete search history.

(56) References Cited

U.S. PATENT DOCUMENTS

| | | | |
|---|---|---|---|
| 4,763,680 A | * | 8/1988 | Acosta, Sr. .................... 135/68 |
| 4,830,037 A | | 5/1989 | Held |
| 4,846,524 A | | 7/1989 | Gerber |
| D355,424 S | | 2/1995 | Williams et al. |
| 5,904,114 A | * | 5/1999 | Wright ........................ 114/361 |
| 6,216,714 B1 | | 4/2001 | Tucker |
| 6,220,647 B1 | | 4/2001 | Winkler |
| 6,227,217 B1 | | 5/2001 | Peta |
| 6,416,109 B1 | | 7/2002 | Tyrer et al. |
| 6,578,854 B2 | | 6/2003 | Wucherpfennig et al. |
| 6,601,904 B2 | | 8/2003 | Winkler |
| 6,692,058 B1 | | 2/2004 | Micco |
| D520,937 S | * | 5/2006 | Eisenhauer ................ D12/401 |

* cited by examiner

*Primary Examiner*—Joseph D Pape
(74) *Attorney, Agent, or Firm*—Boyle Fredrickson S.C.

(57) ABSTRACT

A convertible top device for a vehicle includes a main frame support pivotally attached to a vehicle, a forward support pivotally attached to the main frame support, a rearward support pivotally attached to the main frame support and a top extended over the forward support, main support and the rearward support. At least one strap is interconnected between the forward support and a forward end of the vehicle and the rearward support and the rearward end of the golf cart. The top device is convertible between an open position and a stowed position at the rearward end of the vehicle.

20 Claims, 3 Drawing Sheets

CONVERTIBLE TOP DEVICE AND METHOD

CROSS REFERENCE TO RELATED APPLICATIONS

This application claims priority under 35 U.S.C. §119(e) to U.S. Provisional Application Ser. No. 60/601,471 filed Aug. 13, 2004, and entitled "Convertible Top Device and Method" the entire contents of which are hereby expressly incorporated by reference into the present application.

BACKGROUND OF THE INVENTION

1. Field of the Invention

The present invention relates in general to the field of motorized vehicles such as golf carts. More specifically, the invention relates to a convertible top device adapted to mount on a golf cart or other vehicle.

2. Description of the Invention

Small motorized vehicles are used in a wide variety of applications. Examples of such motorized vehicles include golf carts, lawn movers, lawn tractors and all-terrain vehicles. It is well-known that elements of the weather that penetrate an open cockpit of a vehicle can have a deleterious effect not only on the human operator and occupants of the vehicle, but also cause deterioration of interior components of the vehicle exposed to those elements. Areas of consideration inherent with an open cockpit of a vehicle include exposure to ultraviolet rays and excessive heat. Other areas of consideration inherent with an open-cockpit vehicle include protection from inclement weather, wind, dirt particles, flying objects, and insects. The need for protection from the suns rays is quite evident. The sun's ultraviolet rays can cause harmful effects to both the interior of a cart and its occupants. Various known cover or top devices have been developed with sunshades, screens, covers, and enclosures for various forms of open cockpit vehicles (e.g., motorcycles, mowers, four-wheelers, tractors, agricultural machines, and boats).

In particular, certain known top devices have been designed for golf carts. Golf is a game which requires players to travel a great distance in order to complete a typical round of nine or eighteen holes. While walking a course and carrying a golf bag, or having a caddy carry a golf bag, is one means of traversing a course, many players prefer the speed and comfort of using a golf cart to move about a course.

In addition to providing a cover for the open cockpit of the golf cart, another consideration of a golf cart is to provide a cover for a player's equipment (e.g., clubs) typically stowed or located in a golf bag carrier assembly or compartment positioned at the rear of the cart. As golf bags and golf clubs contained therein are relatively expensive equipment to the sport, their owners generally take care to preserve them. Consequently keeping the clubs and bags out of inclement weather as well as the sun is generally considered good maintenance.

There have been several known top devices created to provide shelter for golf carts. These tops have been called by various names through the years, including roofs, canopies, umbrellas and tops. Generally, these tops are designed to shield occupants of the vehicles from sun, rain and other forms of inclement weather. Many of these devices are permanently affixed and do not provide protection for golf clubs.

A typical top comprises an upper, generally horizontally extending sheet like member that is supported by four generally vertically extending standards or struts. The front of the top typically is supported by two legs of a front standard, which can be formed in a U-shape, while the rear of the top can be supported by two independent standards. Examples of such tops can be found for example in U.S. Pat. No. 5,031,713, to Criscuolo, the disclosure of which is entirely incorporated by reference. The standards attach to the frame of the vehicle in a manner such that the vehicle frame can support the loading of the top. Such fixed assemblies, however, do not allow a user to selectively enjoy the sun or more favorable weather. The tops of these assemblies are permanently fixed in place.

Additional examples of prior art structures are discussed below. The disclosures of these references are hereby expressly incorporated by reference. Mills U.S. Pat. No. 5,921,609 discloses an application for an open cockpit vehicle, such as a golf cart, wherein a shade rolls up and down covering the entrances to the passenger compartment. Mills only provides selective protection on the side of the cart and has a major disadvantage do to the flapping movement of the shade while the vehicle is in operation, as the edge of the shade faces forward into wind caused from the vehicle's forward motion. Additionally, U.S. Pat. No. 5,741,041, to Sullivan discloses a rollup, portable, removable rear cover spanning from the roof of the golf cart and extending over the rear area where the golf bags are stored. The assembly utilizes shock cords, grommets and loops to secure the cover. The upper portion of the cover is composed of transparent plastic, facilitating, rear visibility, and a lower portion composed of woven fabric. Although Sullivan addresses the need to protect the golfing equipment in the rear of the golf cart, the invention would not provide significant protection to the occupants of the vehicle from the sun's rays or inclement weather.

U.S. Pat. No. 4,846,524 to Gerber, the disclosure of which is hereby expressly incorporated by reference discloses a frame for a fold down top for vehicles. Gerber discloses a frame system for a fold down top for vehicles having an open in-use position and a folded position for storage. The frame system includes first and third generally rectangular-shaped perimeter frame members each having opposing transverse portions and opposing longitudinal side portions extending therebetween. Also included is a second U-shaped frame member having a midportion and opposing side portions extending therefrom. In the frame system's open position, the first frame member is pivotally connectable along its lower ends to the vehicle about a first axis in a somewhat upright position.

While Gerber was somewhat satisfactory for its purpose, it exhibits numerous deficiencies. Gerber has no reinforcing mechanism for the forwardly extending portion of the frame. As a result in high winds or rough conditions the frame is like to shake and sway. Additionally, when the frame is in its storage position, access to the golf bag supports on the rear portion of the cart can be obstructed. Furthermore, Gerber's top does not cover the attached golf clubs.

In addition to the above noted deficiencies, many known top frames are packaged without the standards and the fastening members being connected together. Instead, only during final assembly by a dealer, for instance, are the components joined together and mounted to the vehicle. This results in excessive installation time and expense on behalf of the dealer or other installation person. In addition, fastening members can become lost or easily misplaced between the factory and the on-site installation.

While these known top devices typically serve their intended purpose, they are cumbersome and expensive to install. Moreover, these known top devices lack versatility to accommodate varying designs of the golf carts.

As may be seen from the following analysis, there have been a large number of attempts to provide a golf cart top that provide a cover for the internal compartment. Many of these efforts have proven unsatisfactory and have failed to provide for a sturdy convertible top that allows for the selective raising and lowering of the top. These devices have not addressed several of the other deficiencies in the art. Most of these devices do not provide for selective application and those that do are often unstable and obstructing in the lowered position. Additionally, many of these devices include complex mechanisms, and require considerable effort to attach the top to a golf cart. Many of the devices are not robust enough to meet the demands of the many climates in which people play golf.

What is therefore needed in light of the above is an improved top for small motorized vehicles that exhibits enhanced robustness, selective application and ease of use. There is a further need for a cover or top device that is lightweight and easy to install over an open cockpit vehicle such as a golf cart. Moreover, there is a need for a top device that is inexpensive to manufacture. Still yet there is a need to provide a cover or top device that is readily convertible between an open or covered position and a stowed or uncovered position in relation to the open cockpit and the stowed equipment of the vehicle. If rainy conditions are not present, there is a need for a top device that can be readily moved and folded away in a neat and compact fashion.

SUMMARY AND OBJECTS OF THE INVENTION

In view of the foregoing, it is one object of the present invention to provide a convertible top for a golf cart that is selectively convertible between an open or covered position and a stowed or uncovered position in relation to the open cockpit and the stowed equipment of the vehicle. It is another object of the present invention to provide a convertible top for a golf cart that can be readily moved and folded away in a neat and compact fashion. It is another object of the invention to provide a convertible top that is lightweight and easy to install over an open cockpit vehicle such as a golf cart.

Consistent with the foregoing objects, and in accordance with the invention as embodied and broadly described herein, a top device for a vehicle, a method of converting a top device of a vehicle from an open position to a stowed position and a convertible top for a golf cart are disclosed in suitable detail to enable one of ordinary skill in the art to make and use the invention.

In accordance with a first aspect of the invention a top device for a vehicle includes a main frame support pivotally attached to the vehicle, a forward support pivotally attached to the main frame support, a rearward support pivotally attached to the main frame support and a top extended over the forward support, main support and the rearward support in an open position. The top device is convertible between an open position and a stowed position at the rearward end of the vehicle. The top device may include at least one strap adjustably interconnected between the top device and the vehicle. In one embodiment, the device includes a first strap adjustably interconnected between the forward support and the forward end of the vehicle and at least one strap adjustably interconnected between the rearward support and the rearward end of the vehicle.

In another preferred embodiment, the forward support is pivotally attached to the main frame support at a location above the attachment of the pivotally attached rearward support. The forward support is made from a pair of pivot arms that are pivotally connected to the main frame support and a u-shaped portion pivotally connected to the pair of pivot arms. A pair of sleeves is configured to slide over the pivot couplings connecting the pair of pivot arms to the u-shaped portion. The main frame support may be a rectangular member configured to be mounted to a golf club storage assembly. In another embodiment, the top device includes a protective storage bag configured to enclose the top device in the stowed position.

In accordance with a second aspect of the invention a method of converting a top device of a vehicle from an open position to a stowed position includes the steps of securing a frame assembly in an open position over the cockpit of the vehicle with at least one adjustable strap, releasing the adjustable straps, sliding a first sleeve from over a first pivot coupling between a U-shaped portion and a first pivot leg of the forward support, sliding a second sleeve from over a second pivot coupling between the U-shaped portion and a second pivot leg of the forward support, folding the U-shaped portion of the forward support about the first pivot leg and the second pivot leg of the forward support, folding the forward support about the first pivot leg and the second pivot leg toward a main frame support of the frame assembly, folding the rear support from the open position toward the main support and folding the main support and collapsed cover in support thereof in a rearward direction toward the stowed position located at a rearward end of the vehicle.

The step of securing the frame assembly in the open position over the cockpit of the vehicle with at least one adjustable strap may include securing a first strap between the forward support and the forward end of the vehicle and securing at least one strap between the rearward support and the rearward end of the vehicle. In one embodiment, the method includes the steps of placing the top device in a protective storage bag. In another embodiment the method includes the steps of securing the cover to the frame assembly by placing a cover first sleeve over the front support and a cover second sleeve over the rear support.

In accordance with a final aspect of the invention, a convertible top for a golf cart includes a frame assembly and a top configured to be secured to the frame assembly. The frame assembly includes a rectangular main frame support pivotally attached to a golf club storage assembly, a forward support pivotally attached to the main frame support and a rearward support pivotally attached to the main frame support below the attachment of the forward support. The frame assembly is convertible between an open position and a stowed position at the rearward end of the vehicle. At least one strap is interconnected between the forward support and a forward end of the golf cart and the rearward support and the rearward end of the golf cart. In one embodiment, the forward support is comprised of a pair of pivot arms pivotally connected to the main frame support and a u-shaped portion pivotally connected to the pair of pivot arms. A retaining means such as a slidable attached sleeve is configured to retain the u-shaped portion in an extended, open position.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
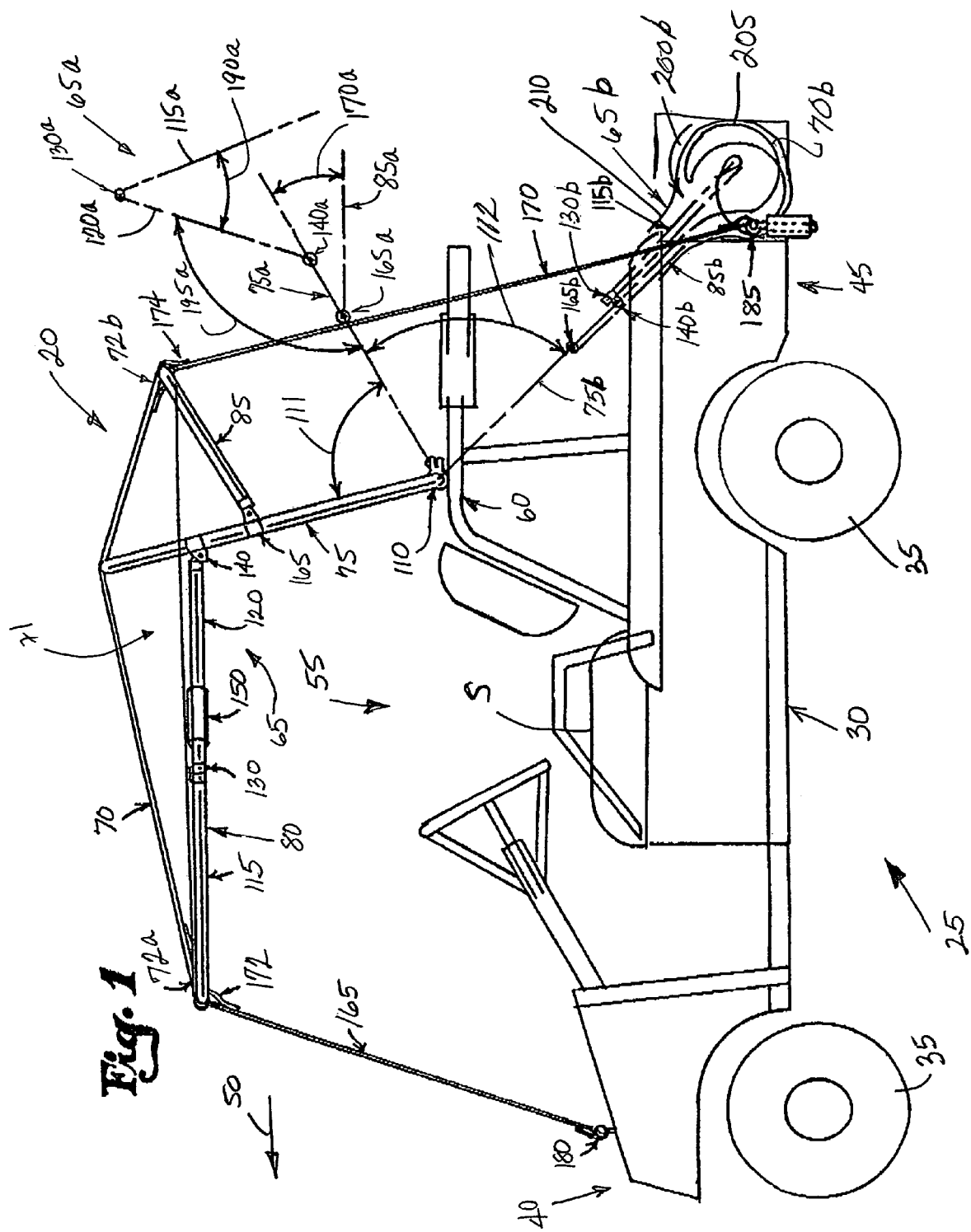
FIG. 1 is a schematic diagram of a side elevation view of a top device in accordance with the invention mounted on a golf cart.

In describing the preferred embodiments of the invention that are illustrated in the drawings, specific terminology will be resorted to for the sake of clarity. However, it is not intended that the invention be limited to the specific terms so selected and it is to be understood that each specific term includes all technical equivalents that operate in a similar manner to accomplish a similar purpose. For example, the word "connected" or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

The present invention relates to a convertible top for a vehicle that includes a frame assembly and a top configured to be secured to the frame assembly. The frame assembly includes a rectangular main frame support pivotally attached to the vehicle, a forward support pivotally attached to the main frame support and a rearward support pivotally attached to the main frame support below the attachment of the forward support. A top configured to be secured to the frame assembly. The top is selectively convertible between an open or covered position and a stowed or uncovered position in relation to the open cockpit and the stowed equipment of the vehicle.

2. Detailed Description of the Preferred Embodiments

Specific embodiments of the present invention will now be further described by the following, non-limiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

FIG. 1 shows an exemplary embodiment of a top device or assembly 20 mounted on a vehicle. The exemplary vehicle is a golf cart 25. The preferred golf cart 25 includes a frame body 30 mounted on a series of wheels 35. The frame body 30 has a forward end 40 and rearward end 45 relative to a forward direction of travel (indicated by arrow 50) of the golf cart 25. The golf cart 25 further includes an open cockpit 55 with an operator's seat S to receive an operator of the golf cart 25. The golf cart 25 further includes a golf club carrier assembly 60 mounted at the rearward end 45 of the golf cart 25. The preferred golf club carrier assembly 60 includes a series of linkages configured in a known manner to retain the golf club bags and clubs contained therein for ready accessibility by the operator.

Still referring to FIG. 1, the top device 20 generally includes a frame assembly 65 configured to support a canopy or top cover 70 over the golf cart 25. The preferred frame assembly 65 generally includes a main frame support 75, a front bar support 80, and a rear bar support 85, interconnected to support the top cover 70 over the cockpit 55 and the golf club carrier assembly 60 of the cart 25. The top device 20 is convertible between an open position (shown in solid lines), a transitional position (shown in dashed lines referenced by 65*a*), and a stowed position (shown in dashed lines referenced by 65*b*) located at the rearward end 45 of the cart 25.

Figure 5:
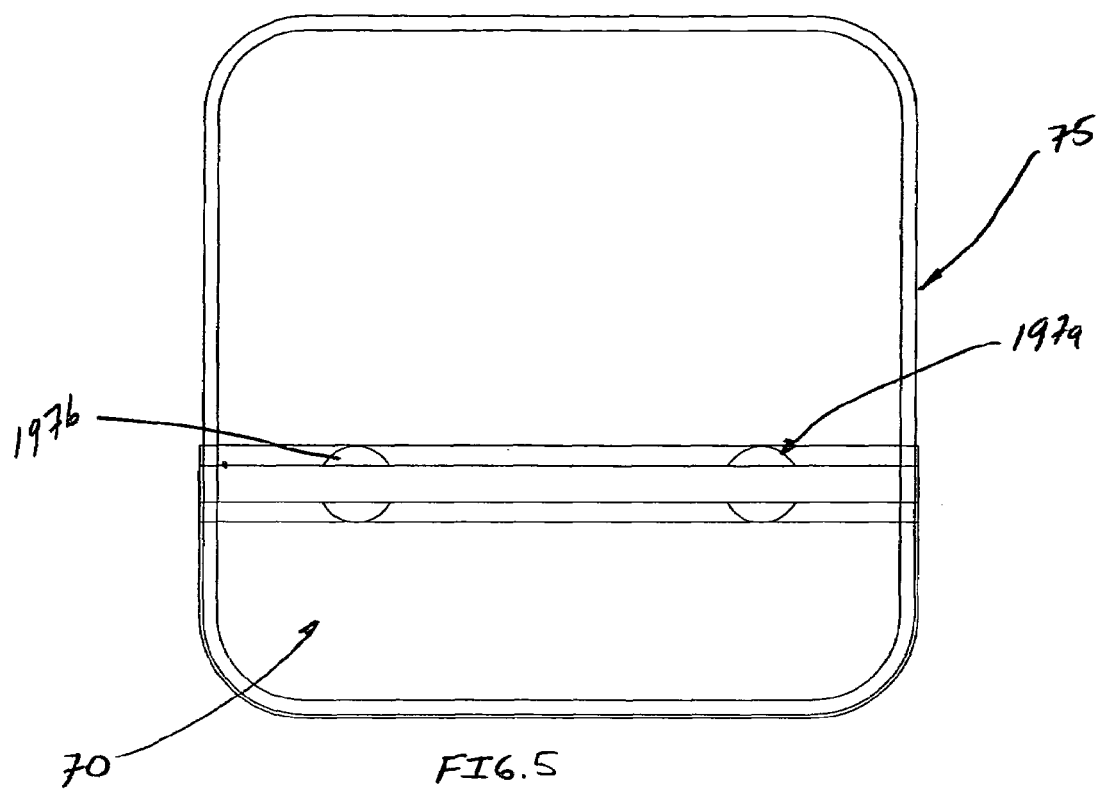
FIG. 5 is a schematic of the main frame support of the frame assembly with the top cover attached.

As illustrated in FIG. 1, the top cover 70 is applied over the frame assembly 65 as shown to provide sun and rain protection for the occupants of the cart 25 while seated atop seat S, as well as to provide protection for the golf clubs stored at the golf club carrier assembly 60 located at the rearward end 45 of the golf cart 25. The preferred top cover 70 includes sleeves 72*a* and 72*b* to receive the front support 80 and the rear support 85, respectively. The top cover 70 can further include a sleeve to receive the main frame support 75. As illustrated by FIG. 5, top cover may include a pair of circular cut outs 197*a*, 197*b* configured to receive straps for securing the cover to the frame assembly 65. Top cover forms integral side walls 71 extending between the distal end of main frame support 75 and the front support 80 when it is placed on the frame assembly 65. The preferred top cover 70 is comprised of an acrylic cloth which covers over the top and sides of the cart 25 with maximum durability, protection and color retention. The acrylic cloth is configured to resist fading and is weather resistant.

Figure 2:
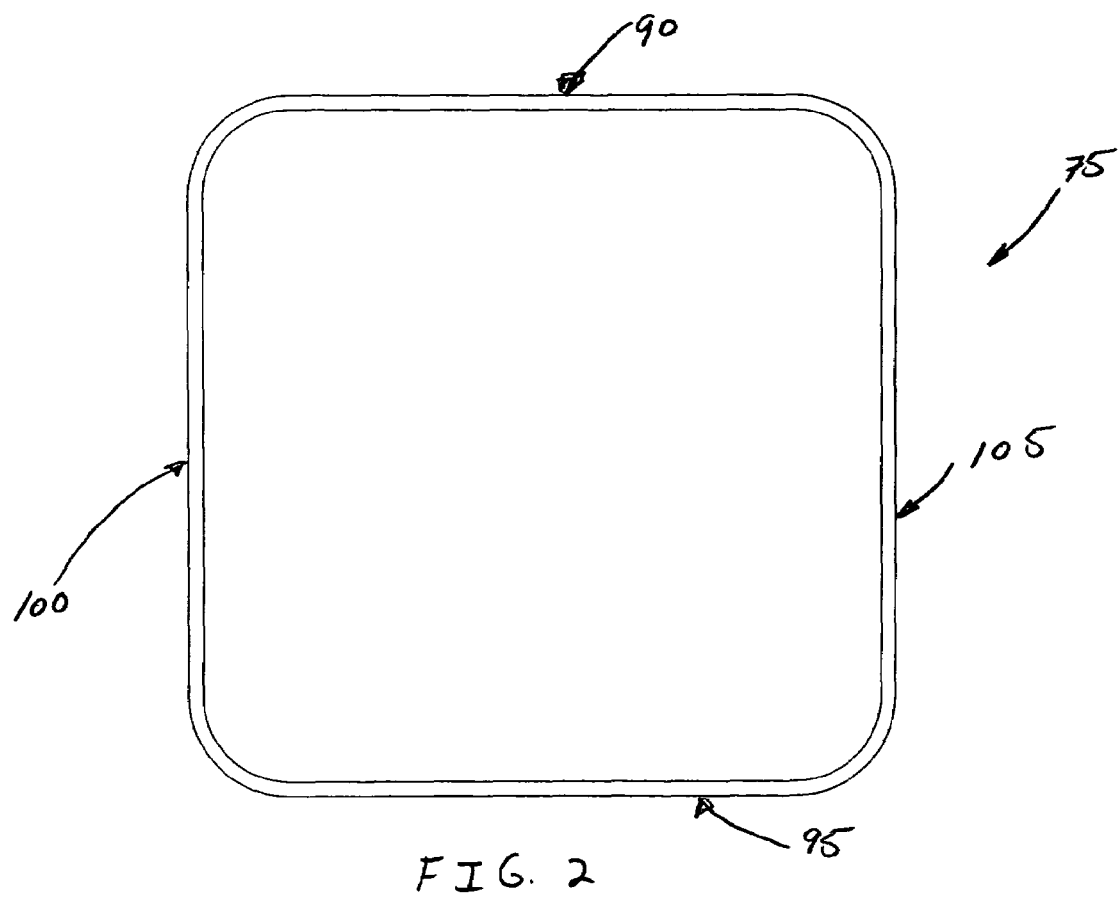
FIG. 2 is a schematic diagram of a detailed view of the main frame support of the frame assembly of top device shown in FIG. 1.

Referring to FIG. 2, the preferred main frame support 75 has a generally rectangular perimeter shape having an upper transverse portion 90 and a lower transverse portion 95 and first and second side portions 100 and 105 interconnected therebetween. As shown in FIG. 1, the lower transverse portion 95 of the main frame support 75 is pivotally connected by an articulating mounting support 110 coupled to the golf club storage assembly 60. The main support 75 is pivotable from an open position (shown in solid line) to a transitional position (shown in dashed line by reference 75*a*) illustrated by arrow 111, and pivotable from the transitional position 75*a* to a stowed position (shown in dashed line by reference 75*b*) as illustrated by arrow 112.

Figure 3:
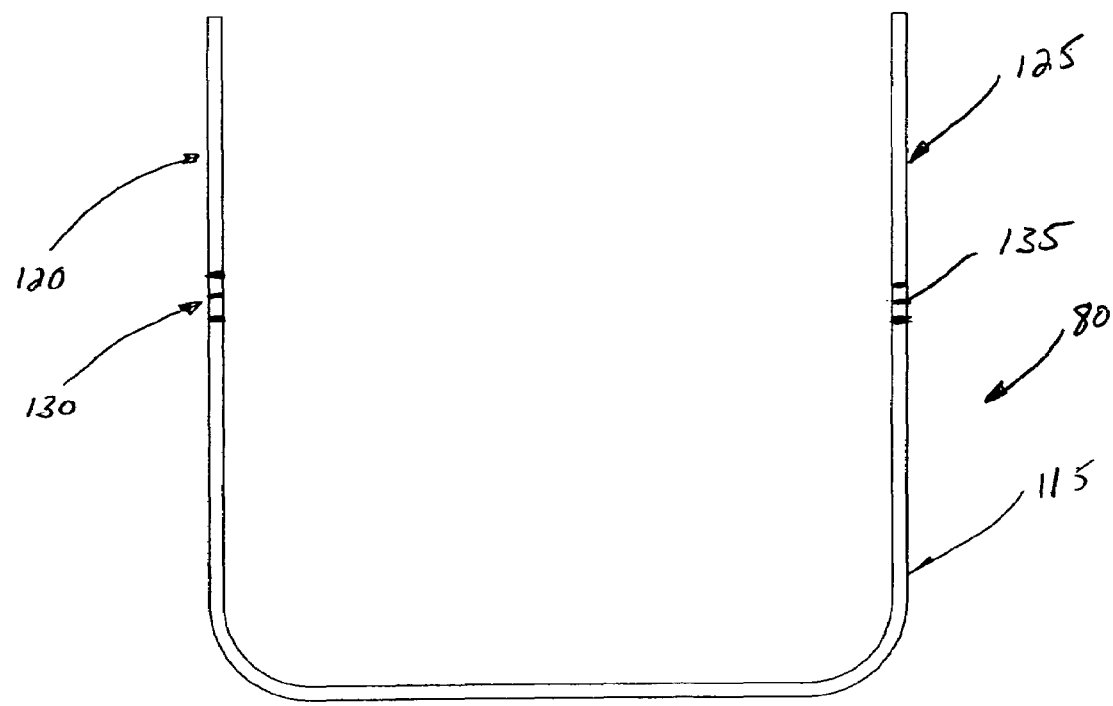
FIG. 3 is a schematic diagram of a detailed view of the rear bar support of the frame assembly of the top device shown in FIG. 1.

As illustrated in FIG. 3, the preferred front bar support 80 generally includes a U-shaped portion 115 and a first pivot arm 120 and a second pivot arm 125. Referring back again to FIG. 1, the U-shaped portion 115 is interconnected by a first pivot coupling 130 to the first extended pivot arm 120, and interconnected by a second pivot coupling 135 to the second pivot arm 125. The first and second pivot arms 120 and 125 each are attached by a pivot coupling 140 (e.g., a jaw hinge) to the main frame support 75. Sleeves 150 are configured to slide over the pivot couplings 130 and 135, and restrain the U-shaped portion 115 in an extended, open position relative to the first and second pivot arms 130 and 135, as shown in FIG. 1.

Figure 4:
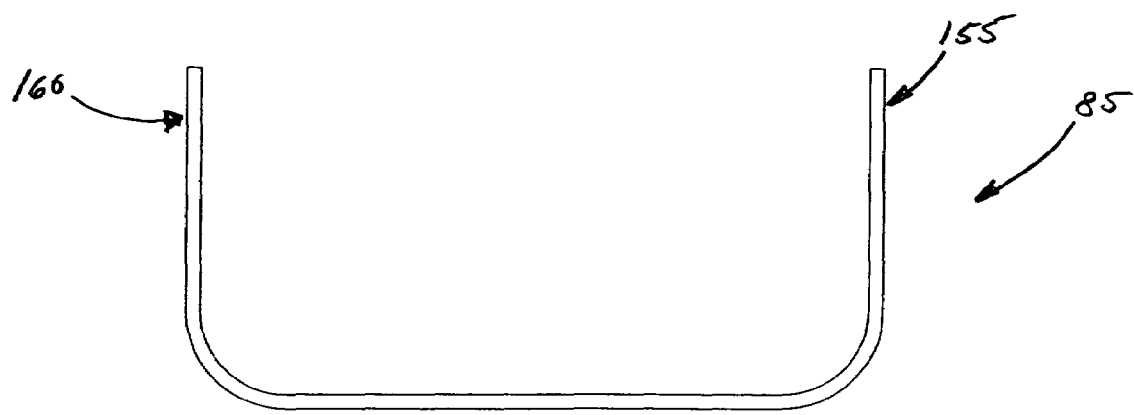
FIG. 4 is a schematic diagram of a detailed view of the front bar support of the frame assembly of the top device shown in FIG. 1.

Referring now to FIG. 4, the preferred rear support 85 is generally U-shaped and includes a first leg 155 and a second leg 160. Referring back again to FIG. 1, the first and second legs 155 and 160 are each connected by a pivot coupling 165 (e.g., a jaw hinge assembly) to the main frame support 75. The rear support 85 is configured to pivot (illustrated by arrow 170) from the main frame support 75 between the open and stowed positions of the convertible top assembly 20.

The top assembly 20 further includes a series of straps 165 and 170 configured to restrain the frame assembly 65 in the open position. The series of adjustable straps 165 and 170 includes a front strap 165 interconnecting the U-shaped portion 115 of the front bar support 80 with an eyebolt mount assembly 180 attached at the forward end 40 of the golf cart 25. The rearward strap 170 is configured to interconnect the rear support 85 with an eyebolt mount assembly 185 attached at the rearward end 45 of the golf cart 25 frame. Although FIG. 1 shows only single front 165 and rearward 170 straps, the front 165 and rearward 170 straps can include a left-side strap and a right-side straps. The rearward straps 170 can attached by respective eyebolt mount assemblies 185 at each side of the rearward end 45 of the cart 25. The preferred straps 165 and 170 are comprised of polypropylene material, but the composition of the straps can vary. The straps 165 and 170 each include strap loops 172 and 174, respectively configured to receive the front and rear support members and 85, respectively, or the associated eyebolt mount assemblies 180 and 185, respectively. The preferred straps 165 and 170 are adjustable so as to accommodate various designs of golf carts 25 as well as to locate the top assembly 20 in a desired position relative to the cockpit 55 as well as the golf club carrier assembly 60.

In operation and still referring to FIG. 1, the closing and opening geometry of the convertible top device 20 is depicted in increments from the fully open position (shown in solid line) folded toward the transitional position (illustrated in dashed line by reference 65a) and to the stowed position (illustrated in dashed line by reference 65b) at the rearward end 45 of the golf cart 25. From the fully open position, the collar or sleeves 150 at the front bar support 80 are released, and the U-shaped portion 115a of the front bar support 80a can be pivoted in a rearward direction (as illustrated by arrow 190a) about pivot coupling 130a relative to the forward direction of travel 50 of the cart 25. The first and second pivot arms 120 and 125 of the front bar support 80 can be pivoted in a direction (as illustrated by arrow 195a) toward the main frame support 75a about pivot coupling 140a. Also, the main frame support 75a can be pivoted in a rearward direction (as illustrated by arrow 111) about pivot coupling 110 relative to the forward direction of travel 50 of the cart 50. The rear support 85a can be pivoted in a direction (as illustrated by arrow 170a) toward the main frame support 75a about pivot coupling 165a. The frame assembly 65a can continue to be pivoted in a rearward direction (as illustrated by arrow 112) about pivot coupling 110 toward the stowed position (illustrated in dashed line by reference 65b) at the rearward end 45 of the golf cart 25. With the stowed position 65b, as to stow into itself in a neat parallel position, the top cover (illustrated in dashed line by reference 70b) is folded in a collapsed position (as illustrated by arrow 200b) with the frame assembly 65b in the stowed position. The top device 20 can be returned to the extended/expanded, open position (illustrated in solid line) by reversal of the steps described above.

When the frame assembly 65 and the top cover 70 are disposed in the stowed position, the top device 20 preferably fits behind the golf bag carrier assembly 60 and inside a bumper 205 of the golf cart 25. The series of straps 165 and 170 also can become an integral part in stowing the top device 20 in the stowed position at the rearward end 45 of the golf cart 25.

The top device 20 can further include a protective storage bag 210 configured to enclose the stowed top device 20b in a neat, compact package. The storage bag 210 can be stored inside the bumper 205 and/or clipped at the bumper 205, thereby stowing the top device 20 in a compact and aesthetical enhanced orientation and fashion on the golf cart 25. Furthermore, valances can be provided for additional sun protection. The preferred frame assembly 65, 65b, and 65c is constructed of heavy 18-gauge stainless steel tubing, with rugged steel plated marine grade hardware.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

For example, the invention discloses sleeves 150 configured to slide over the pivot couplings 130 and 135, and restrain the U-shaped portion 115 in an extended, open position relative to the first and second pivot arms 130. Alternative restraining members such as a locking pin or other known arrangement could be utilized.

Moreover, as noted throughout the application the individual components need not be formed in the disclosed shapes, or assembled in the disclosed configuration, but could be provided in virtually any shape, and assembled in virtually any configuration, so as to provide for a selectively useable top assembly. Although the preferred embodiment has been described in relation to a golf cart, it is understood that the inventive top can be used with a wide variety of vehicles. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

I claim:

1. A top device for a vehicle having a forward end and a rearward end, comprising:
   a main frame support pivotally attached to the vehicle by a mounting support;
   a forward support pivotally attached at one end to the main frame support by a first support pivot coupling;
   a rearward support, wherein one end of the rearward support is pivotally attached to the main frame support between the first support pivot coupling and the mounting support;
   a cover extended over the forward support, main support and the rearward support in an open position; and
   wherein the top device is convertible between an open position and a stowed position at the rearward end of the vehicle.

2. The top device of claim 1, further comprising at least one strap adjustably interconnected between the top device and the vehicle.

3. The top device of claim 2, wherein the at least one strap is comprised of a first strap adjustably interconnected between the forward support and the forward end of the vehicle; and at least one strap adjustably interconnected between the rearward support and the rearward end of the vehicle.

4. The top device of claim 1, wherein the cover comprises a first sleeve configured to receive the front support and a second sleeve configured to receive the rear support.

5. The top device of claim 1, wherein the forward support is comprised of a pair of pivot arms, each pivot arm having an end pivotally connected to the main frame support, and a u-shaped portion pivotally connected to the pair of pivot arms.

6. The top device of claim 5, further comprising a pair of sleeves configured to slide over pivot couplings connecting the pair of pivot arms to the u-shaped portion.

7. The top device of claim 6, further comprising a protective storage bag configured to enclose a portion of the top device and the cover in the stowed position. wherein the stowed position is adjacent a rear bumper of the vehicle.

8. The top device of claim 1, wherein the main frame support is a rectangular member configured to be mounted to a golf club storage assembly, the main frame support being sized so that the cover and a portion of the top device fits behind a golf bag carrier assembly when in the stowed position.

9. The top device of claim 1, wherein the vehicle is a golf cart.

10. A method of converting a top device of a vehicle from an open position to a stowed position, the top device including a top cover configured to be supported by a frame assembly in the open position over the cockpit of the vehicle, the method comprising the steps of:
  securing the frame assembly in the open position over the cockpit of the vehicle with at least one adjustable strap interconnecting the frame assembly and the vehicle, the frame assembly including a forward support extended over the cockpit in the open position, the frame assembly further including a rear support extended over a rear storage area of the vehicle in the open position;
  releasing the adjustable straps;
  sliding a first sleeve from over a first pivot coupling between a U-shaped portion and a first pivot leg of the forward support, and sliding a second sleeve from over a second pivot coupling between the U-shaped portion and a second pivot leg of the forward support;
  folding the U-shaped portion of the forward support about the first pivot leg and the second pivot leg of the forward support;
  folding the forward support about the first pivot leg and the second pivot leg toward a main frame support of the frame assembly;
  folding the rear support from the open position toward the main support;
  folding the main support and collapsed cover in support thereof in a rearward direction toward the stowed position located at a rearward end of the vehicle; and securing the top device in the stowed position adjacent a bumper of the vehicle.

11. The method of claim 10, wherein the step of securing the frame assembly in the open position over the cockpit of the vehicle with at least one adjustable strap comprises securing a first strap between the forward support and the forward end of the vehicle and securing at least one strap between the rearward support and the rearward end of the vehicle.

12. The method of claim 10, further comprising the step of placing the top device in a protective storage bag.

13. The method of claim 10, further comprising the step of securing the cover to the frame assembly by placing a cover first sleeve over the front support and a cover second sleeve over the rear support.

14. A convertible top for a golf cart comprising:
  a frame assembly comprising;
  a rectangular main frame support pivotally attached to a golf club storage assembly;
  a forward support having one end pivotally attached to the main frame support;
  a rearward support pivotally attached to the main frame support below the attachment of the forward support;
  wherein the main frame support, the forward support. and the rearward support each pivot about different axes; and
  a cover configured to be secured to the frame assembly.

15. The convertible top of claim 14, wherein the frame assembly is convertible between an open position and a stowed position adjacent a rear bumper of the vehicle.

16. The convertible top of claim 14, further comprising at least one strap interconnected between the forward support and a forward end of the golf cart; and at least one strap interconnected between the rearward support and the rearward end of the golf cart.

17. The convertible top of claim 14, wherein the forward support is comprised of a pair of pivot arms pivotally connected to the main frame support and a u-shaped portion pivotally connected to the pair of pivot arms.

18. The convertible top of claim 17, further comprising a retaining means configured to retain the u-shaped portion in an extended, open position.

19. The convertible top of claim 18, wherein the retaining means is a slidably attached sleeve.

20. A top device according to claim 8, wherein the cover and a portion of the top device is stored inside a storage bag adjacent a bumper of the vehicle.

* * * * *